(12) United States Patent
Denzin et al.

(10) Patent No.: US 11,057,754 B2
(45) Date of Patent: Jul. 6, 2021

(54) METHOD FOR OPERATING A WIRELESS COMMUNICATION DEVICE

(71) Applicant: GEMALTO M2M GMBH, Munich (DE)

(72) Inventors: Florian Denzin, Berlin (DE); Oliver Michael, Berlin (DE); Lars Wehmeier, Falkensee (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 148 days.

(21) Appl. No.: 15/742,241

(22) PCT Filed: Jun. 30, 2016

(86) PCT No.: PCT/EP2016/065358
§ 371 (c)(1),
(2) Date: Jan. 5, 2018

(87) PCT Pub. No.: WO2017/009059
PCT Pub. Date: Jan. 19, 2017

(65) Prior Publication Data
US 2018/0206121 A1    Jul. 19, 2018

(30) Foreign Application Priority Data
Jul. 10, 2015    (EP) .................................. 15176268

(51) Int. Cl.
*H04W 12/08* (2021.01)
*H04W 48/08* (2009.01)
(Continued)

(52) U.S. Cl.
CPC .............. *H04W 4/50* (2018.02); *H04W 4/70* (2018.02); *H04W 12/06* (2013.01); *H04W 12/082* (2021.01); *H04W 48/08* (2013.01)

(58) Field of Classification Search
CPC ..... H04W 12/06; H04W 12/08; H04W 12/12; H04W 4/50; H04W 4/70; H04W 48/08
See application file for complete search history.

(56) References Cited

U.S. PATENT DOCUMENTS

| | | | |
|---|---|---|---|
| 2011/0195693 A1* | 8/2011 | Nagasawa | H04M 3/42374 455/412.2 |
| 2014/0032757 A1* | 1/2014 | Ljung | H04L 41/00 709/225 |

(Continued)

FOREIGN PATENT DOCUMENTS

| WO | WO 2011/158842 A1 | 12/2011 |
|---|---|---|
| WO | 2013113925 A1 | 8/2013 |
| WO | WO 2013/113925 A1 | 8/2013 |

OTHER PUBLICATIONS

"IoT Device Connection Efficiency Guidelines", GSM Association, Version 2.0, Jul. 1, 2015, pp. 1-81.
(Continued)

*Primary Examiner* — Joseph P Hirl
*Assistant Examiner* — Thomas A Gyorfi
(74) *Attorney, Agent, or Firm* — Buchanan Ingersoll & Rooney PC

(57) ABSTRACT

The present invention relates to a method for operating a wireless communication device in a cellular network, the wireless communication device comprising a communication unit and a controlling appliance, interconnected by a control interface, the communication unit comprising a network access manager unit, the method comprising for the communication unit the steps of: —receiving from the cellular network a network access guidance —handling the received network access guidance at the network access manager unit, —as part of handling the network access guidance, interpreting the received network access guidance and providing information relating to the network access (Continued)

guidance resulting from said interpretation step to the controlling appliance, —ascertaining by means of the control interface from the controlling appliance a response relating to said network access guidance, —handling in the network access manager unit the response relating to said network access guidance.

14 Claims, 3 Drawing Sheets

(51) Int. Cl.
    *H04W 12/06*     (2021.01)
    *H04W 12/12*     (2021.01)
    *H04W 4/50*     (2018.01)
    *H04W 4/70*     (2018.01)
    *H04W 12/082*     (2021.01)

(56) References Cited

U.S. PATENT DOCUMENTS

2014/0105009 A1    4/2014  Vos et al.
2015/0230090 A1*  8/2015  Barkan ............... H04L 63/0876
                                                      455/411

OTHER PUBLICATIONS

International Search Report (PCT/ISA/210) dated Sep. 8, 2016, by the European Patent Office as the International Searching Authority for International Application No. PCT/EP2016/065358.
Written Opinion (PCT/ISA/237) dated Sep. 8, 2016, by the European Patent Office as the International Searching Authority for International Application No. PCT/EP2016/065358.
First Office Action dated Apr. 22, 2020 in corresponding Chinese Patent Application No. 201680040470.8, with English Translation, 15 pages.

* cited by examiner

METHOD FOR OPERATING A WIRELESS COMMUNICATION DEVICE

FIELD OF THE INVENTION

The present invention relates to a method for operating a wireless communication device in a cellular network.

The invention also pertains to a wireless communication device using said method.

BACKGROUND OF THE INVENTION

Generally, in the field of wireless communication it is known that the cellular networks are facing a tremendous amount of so-called machine-type communication (MTC) devices, which use to behave differently than mobile handsets. In particular through the automatic character of certain network activities remarkable peaks of network signaling can occur, where the cellular networks are currently not prepared for.

As a matter of facts, cellular networks start to take measures to influence the behavior of such MTC devices. Such measures are summarized under the term network access guidance.

One example for such a network access guidance is documented in the GSMA network efficiency guide (GSMA Association, Official Document CLP.03: IoT Device Connection Efficiency Guidelines V1.0, 13.10.2014).

MTC devices are typically composed of a controlling appliance and a communication unit, in particular a wireless module. Those MTC devices have the issue with such network access guidances, that for the controlling appliance the behavior of the communication unit—which is strongly influenced by such a network access guidance—is unpredictable. Moreover in certain cases there is a need from the controlling appliance to influence the communication unit's behavior in response to network access guidances.

This is because the communication unit is not aware of the controlling appliance's context and knowledge whether a network access guidance is appropriate and possible to follow. This is in particular in question when the wireless communication device is installed in a car driving with high velocity and being instructed by the network to download a certain amount of data.

On the other hand it is disadvantageous for the controlling appliance to fully handle the network access guidance. Controlling appliances are generally devices created for a special purpose according to the vertical market of the device manufacturer. Such a vertical market may be a point-of-sale, asset-tracking or an entertainment and security unit in a car. Typically such devices just request from the communication unit connectivity and aim to do nothing more than setup a connection, send or receive data and close the connection.

It would be a tremendous overload to additionally handle the network access guidances in the controlling appliance. This is in particular applies for controlling appliances with a reduced operating power due to low operating requirements from the purpose of the device.

It is therefore the goal of present invention to overcome the mentioned disadvantages and to propose a solution for an improved control of the wireless communication device between controlling appliance and communication unit in order to handle network access guidances.

Further alternative and advantageous solutions would, accordingly, be desirable in the art.

SUMMARY OF THE INVENTION

For this it is according to a first aspect of the invention suggested a method to operate a wireless communication device according to claim 1. It is further suggested according to a second aspect of the invention a wireless communication device according to claim 10. According to a third aspect of the invention it is proposed a Remote server according to claim 14.

It is therefore suggested a method for operating a wireless communication device in a cellular network, the wireless communication device comprising a communication unit and a controlling appliance, interconnected by a control interface, the communication unit comprising a network access manager unit, the method comprising for the communication unit the steps of:

receiving from the cellular network a network access guidance handling the received network access guidance at the network access manager unit, as part of the handling network access guidance, interpreting the received network access guidance and providing information relating to the network access guidance resulting from said interpretation step to the controlling appliance, ascertaining by means of the control interface from the controlling appliance a response relating to said network access guidance, handling in the network access manager unit the response relating to said network access guidance.

The inventive method is envisaged for a wireless communication device which is operating in a cellular network. Such cellular network is supposed to support wireless cellular technology standards like GSM, UMTS and/or LTE. The wireless communication device is communicating with the cellular network over the air interface via base stations of the cellular network, in particular NodeBs or eNodeB, in the following called base station without intended limitation in terms of supported wireless cellular technology standard.

The wireless communication device is in particular camping on a base station, and as such operating in a cellular network. The base station the wireless communication device is camping on is called active base station. Such wireless communication device is preferably rather than a handset a so-called machine-to-machine (M2M) device like a vending machine, an asset tracker, an electronic meter or a home security system.

The wireless communication device comprises at least a communication unit and a controlling appliance.

The communication unit is in particular a M2M module. Further the communication unit comprises a network access manager unit and preferably a network access unit. The network access unit comprises in particular a transceiver for carrying out the actual communication with the active base station via the air interface, that means it typically comprises components like a baseband chip, a radio frequency (RF) unit, an antenna and a protocol stack.

The controlling appliance is the general controlling instance, for instance comprising an interface to the user of the device, in particular an input/output interface of commands and results of executing the commands, like a graphical user interface.

As part of the operation of the wireless communication device the controlling appliance shall make use of connectivity via the cellular network, and as such instructs via a control interface the communication unit to execute data transmissions or receptions or handling phone calls.

The method starts with the communication unit receiving from the cellular network via the active base station and the air interface a network access guidance. The fact that there is an active base station shows, that the communication unit successfully registered at a base station prior to carrying out the inventive method. Such received network access guidance in particular provides at least one wireless communication device with instructions, rules, behavior patterns and/or recommendations for the way the wireless communication device is expected to access the cellular network.

Preferably the cellular network is configured to provide one or more network access guidances to at least one or more wireless communication devices. In particular the base station of a cellular network sends each network access guidance as one or more messages to a subset of wireless communication devices camping on the base station, in particular those belonging to a group e.g. of machine-to-machine devices as opposed to mobile handsets. This is advantageous as it allows the cellular network to configure a plurality of wireless communication devices in one pass.

In particular it is foreseen that the network access guidance is at least one out of the group of:
 a request for over the air software installation,
 a configuration of a radio policy manager software running in the communication unit,
 a presetting value of quality of service requirement of the communication unit,
 a network access restriction,
 a network friendly mode instruction, and/or
 a combination of at least two of said group members.

In case of a network access guidance comprising an over the air firmware installation it is foreseen that the cellular network informs the wireless communication device about the necessity to download a software, in particular a firmware or a part of a firmware, like a patch. Such information preferably indicates to the wireless communication device the path for downloading the software.

This allows the cellular network to initiate the download. Preferably it is a remote server which over the cellular network induces the affected wireless communication devices to start the download.

Alternatively the network access guidance comprises a configuration of a radio policy manager (RPM) software, which is a software provided from the cellular network, running on the wireless communication device, in particular in the communication unit, and influencing the behavior of the communication unit within the cellular network. In particular the software of previous option is a RPM software as well.

Should there be detected a need by the cellular network to change the configuration of the RPM software, this is preferably provided as part of network access guidance. This is advantageous as depending upon the behavior of the wireless communication device, in particular if it is operating network friendly or aggressive, or if it is assigned to a certain group of devices, e.g. static wireless communication devices, the cellular network may adjust the configuration of the RPM software with such network access guidance.

Alternatively the network access guidance comprises a preset value of quality of service requirements for the communication unit. With a reduced quality of service the communication unit would be directed to accept lower quality measures.

Further the network access guidance comprises a network access restriction. In the extreme case this an access ban, at least temporary, which might be in response to undesired behavior or when the cellular network's resources run short, and the wireless communication device is running on a low priority subscription. Further the access restriction might affect certain services or allowable bandwidth.

In a further alternative the network access guidance comprises network friendly mode instructions. This in particular means a couple of instructions how the communication unit may behave in the cellular network in order to be rated as "network friendly". With this rating the wireless communication device would be eligible to certain preferred handlings. In particular if resources on a base station are running short, the base station may bar the more aggressive wireless communication devices from further operating with the base station. A wireless communication device would avoid being barred then, if it behaved according to a network friendly mode. This indicates an additional type of a network access guidance comprising a real choice for the wireless communication device, if the network access guidance is followed or not. Advantageously by this the selection is put into the hand of the wireless communication device.

It is further foreseen that the network access guidance comprises a plurality of behavior patterns for the communication unit, wherein the communication unit is supposed to select one of them and process accordingly. This is preferably an open choice from the cellular network and not in any way biased in direction of a preferred behavior, in particular network friendly mode. Such choices may be taking into account if it is a basically stationary device or not, if it is a low cost device or not, operated in enhanced coverage mode, as opposed to normal coverage mode etc.

Additionally the network access guidance may also comprise a combination of two or more of the mentioned network access guidance possibilities.

Upon reception of such network access guidance the communication unit is supposed to handle the received guidance. In particular the network access manager unit has the task to take the necessary steps for taking into account the received network access guidance. Part of this handling is to provide information relating to the network access guidance to the controlling appliance.

This is in particular advantageous as the controlling appliance knows the context of the wireless communication device. In particular when a major data transmission session is planned, a network access guidance received from the cellular network might not be appropriate for this task. As this information is only available at the controlling appliance, it is the preferred unit to decide how to cope with incoming network access guidance. Hence the network access manager unit provides information relating the received network access guidance to the controlling appliance. Preferably this happens through the control interface between communication unit and controlling appliance.

It is according to the invention further foreseen that prior to providing information to the network access guidance the step of interpreting the received network access guidance, and using results of the interpreting step for providing said information. As opposed to a simple forwarding of data from the received network access guidance or taking a subset of data it is advantageous to carry out a more elaborate method step, where the network access guidance is interpreted. For that a translation step is needed, which converts the network access guidance from the network signaling context to the controlling appliance context.

Preferably the provision of information relating to network access guidance to the controlling appliance is carried out by using the control interface, in particular by means of an asynchronous event. In the case of an AT command interface this would be an unsolicited result code (URC).

The communication unit, resp. the network access manager unit, expects from controlling appliance a response relating to said network access guidance. This is basically a decision how to cope with the network access guidance. The response is received through the control interface. This is either by way of request-response mechanism, or by a message from the communication unit via unsynchronized event, and a response by way of command. In the latter case the communication unit may additionally provide a response to the controlling appliance, at least comprising an ACK/NACK if the command is received and or able to process.

Part of handling the response is in particular an evaluation step of the network access manager unit. Should there other information regarding context or eligibility of the network access guidance, the network access manager unit may take another action. This represents preferably an additional negotiation step between controlling appliance and network access manager unit, which may involve more signaling via the control interface. Depending upon the configuration of the wireless communication device, there is in particular a decision in terms of which component has the final decision about how to cope with incoming network access guidances.

Once the communication unit receives the response from the controlling appliance resp. the final decision from controlling appliance and network access manager unit, it is handled by the network access manager unit. The network access manager unit then processes the response. The pending network access guidance received from the cellular network is hence handled by the network access manager unit taking into account the response from the controlling appliance.

The inventive method and said embodiments are advantageous out of the reason that decisions how to cope with the retrieved network access guidance are basically made where the information base for those decisions is available. The controlling appliance is generally in charge of the overall behavior of the wireless communication device, in particular by means of a user interface where the in particular human operator may input general settings and guidelines.

Hence, the controlling appliance is the place to decide about if, how and when to carry out the network access guidance. On the other hand, the controlling appliance does not know and does not need to know details about the operating within the cellular network. Hence the step of interpreting the network access guidance is located as part of the inventive method in the communication unit, which is the place of expertise with respect to the communication task.

There are a plurality of embodiments foreseen as part of the invention with respect to the response from the controlling appliance and consequently the handling of the network access manager unit.

According to one preferred embodiment it is foreseen that said response from the controlling appliance comprises an instruction relating to time of execution of network access guidance, and the step of handling said response comprises executing network access guidance complying with said time.

This embodiment provides an indication regarding the "when" rather than an "if" the network access guidance is followed by the communication unit. The controlling appliance may with regards to a scheduled software download figure out if the envisaged download is appropriate at that time or not. This is advantageous as if the controlling appliance is aware of a larger date transmission or reception session close by it preferably indicates by way of the response to the network access manager unit that at that time the handling of the network access guidance is not appropriate. Hence, the network access manager unit instructs the communication unit to delay the handling. Preferably the time period in which the network access guidance is expected to be carried out is provided with this or an earlier network access guidance, and provided to the controlling appliance as well. The instruction relating to time of execution of the network access guidance preferably informs the network access manager unit about a point in time when or a duration until the network access guidance is handled and effectively followed. Alternatively the first response from the controlling appliance may merely indicate the network access manager unit about to stall the handling of the received network access guidance. With a second message via the control interface then—in particular after the imminent large data transmission or reception session is finished—the controlling appliance informs the network access manager unit about that the network access guidance may now be handled, that is executed.

According to another preferred embodiment it is proposed a method wherein said response from controlling appliance comprises an instruction relating to a selection of a behavior pattern being part of said information relating to the network access guidance and the step of handling said response comprises applying selected behavior pattern on network access.

This embodiment is in particular based on a network access guidance comprising alternatives, preferably in terms of behavior patterns for the wireless communication device. This preferably applies if the cellular network provides conditions when which of the behavior pattern applies.

Nonetheless the controlling appliance might also have its preferred alternative based on its own context. This in particular applies if one of the alternative behavior patterns provided as part of the network access guidance is more applicable for a wireless communication device with a specific context. Such a context may in particular refer to a static device or a device operating in enhanced coverage.

Here the communication unit resp. the network access manager unit advantageously carries out said interpretation step. As such the at least two behavioral patterns might indicate a preference for a certain context. Then the network access manager unit provides as information relating to the network access guidance to the controlling appliance not much more than the context where according to the network access manager units interpretation the behavior patterns is applied to.

When the controlling appliance receives information regarding the possibility to select between at least two behavior patterns characterized by the context they are applied for, the controlling appliance is put into the position to compare its own context with the ones assigned to the behavior patterns. Hence, the behavior pattern with the best match of contexts is selected and provided as response to the communication unit.

The step of handling said response consequently comprises to apply the behavior pattern selected by the controlling appliance on the imminent network access by the communication unit.

According to another advantageous embodiment it is proposed a method wherein said response from controlling appliance comprises an instruction relating to reject execution of network access guidance, and the step of handling said response comprises sending a rejection message to the cellular network.

This embodiment is applicable to network access guidances that comprise at least an optional character. This applies to recommendations how to behave within the cellular network. In particular recommendations which might negatively influence the power consumption footprint of the communication unit resp. the whole wireless communication device like those concerning adaptations of paging cycles would possibly be rejected by the controlling appliance. This is in particular the case if a limited power supply is available or a given power consumption quota could not be fulfilled when the recommended network access guidance would lead to a remarkable increase of power consumption.

Hence the controlling appliance indicates to the communication unit to reject the network access guidance. The communication unit consequently ignores the network access guidance.

Preferably the communication unit additionally informs the cellular network about the rejection. Additionally it is preferable to provide a reason for this. Consequently the cellular network would then react in terms of not repeating sending the instruction or sending an adapted network access guidance taking into account said received reason for rejection.

According to another preferred embodiment it is suggested a method wherein said response from controlling appliance comprises an instruction relating to contact a preconfigured remote server, and the step of handling said response comprises sending a message to the remote server indicating the network access guidance. This embodiment involves a remote server which is preferably a server which manages a plurality of wireless communication devices with similar characteristics, e.g. a fleet server or aggregator resp. gateway of sensing or metering devices. This remote server is preferably configured to adapt the network access characteristics of the wireless communication devices in the field.

Such a remote server has in particular the capability to control network access characteristics of the wireless communication devices known to it. Preferably the same remote server receives data transmissions, in particular in terms of sensor or metering results, regularly or event based. Also the remote server is foreseen to download data to the wireless communication devices, in particular updates, content like multimedia files or maps etc.

Alternatively said remote server for configuring the network access characteristics is different from the one with that the wireless communication devices actually exchange data. This is in particular advantageous in heterogeneous network environments.

Preferably the remote server is accessed by means of the cellular network. In another preferable embodiment the wireless communication device provides alternative connectivity means, e.g. via Ethernet, Wifi, WiMax, Zigbee, ZWave, Bluetooth or others or a gateway device transparently supporting connectivity means. This makes the access independent of the cellular network, in particular should the network access guidance restrict or bar access to the cellular network for the wireless communication device.

In such a case the communication unit is either a multimode unit, or the wireless communication device comprises two communication units, preferably each for one connection type. In the latter case the controlling appliance would upon reception of the information relating to the network access guidance from the first communication unit respond to the second communication unit in order to trigger the sending of the message to the remote server.

As typically such a server is known to the controlling appliance rather than the communication unit. Hence it is the controlling appliance who needs to identify that upon reception of a network access guidance the remote server needs to be informed.

Hence a message is transmitted by means of the communication unit to the remote server indicating the received network access guidance. In particular this means that the information regarding a received network access guidance provided by the network access manager unit to the controlling appliance triggers the access request command from the controlling appliance to the communication unit.

For the process of handling the network access guidance it is further advantageous when the remote server responds with an indication how to handle this network access guidance, i.e. which configuration to take. Such information is in particular of interest for the communication unit of the wireless communication device. Alternatively or additionally the remote server is preferably configured to adapt network access characteristics, in particular a time schedule and/or quality of service requirements in order to maintain a reliable data transmission or reception scheme with complying with the network access guidance from the cellular network.

Additionally to that it is proposed according to another preferred embodiment a method wherein in response to said message the remote server sends at least one message to at least one wireless communication device different from the wireless communication device sending the message to the remote server.

This embodiment is in particular advantageous for a remote server handling a fleet of wireless communication devices. When the remote server is informed by the respective wireless communication device about particular network access guidance, in particular a restriction or ban, other wireless communication device known to the remote server might—hereinafter second wireless communication devices—get an indication about that.

Such indication is as one option a recommendation for behavior of the second wireless communication device within the cellular network. This comprises typically network access characteristics like those that the wireless communication device sending the information to the remote server—hereinafter the first wireless communication device—would also expect as a response from the remote server. Another option would be an indication about carrying out some urgent tasks before the second wireless communication device is also affected by the network access guidance. This in particular comprises uploads of data or downloads, preferably when a usage restriction or ban is expected.

Such second wireless communication device preferably shares characteristics of the first wireless communication device which sent the request to the remote server.

One option of such characteristics is the location, in particular the cell or location resp. tracking area of the wireless communication devices.

Another option is the cellular network, the wireless communication devices are operating in. This is in particular distinguished in terms of which network operator runs the cellular network, or which radio access network, that means which wireless cellular technology standard, is used. Also a combination of both is part of this embodiment.

Another option of such characteristics is the assignment to a group or domain of devices, either within the network or within the remote server. This in particular refers to MTC devices, low-cost devices or those supporting special signaling means, like enhanced coverage.

Effectively this embodiment allows a consistent adaptation of network access characteristics among the wireless communication devices known to the remote server, or at least a subset of those, and helps ensuring the communication between them.

According to another preferred embodiment it is suggested a method comprising for the network access manager unit as part of handling the response from the control appliance the step of providing the cellular network with an indication relating to the received response.

As part of this embodiment it is foreseen that after the network access manager unit retrieves the response from the controlling appliance, the cellular network gets transmitted a message indicating the way the wireless communication device is about to respect the received network access guidance.

For that the network access manager unit indicates to the communication unit to transmit a message to the active base station. Preferably this is a message in terms of a response to the received network access guidance, in particular depending upon the type and transmission path of the network access guidance. This behavior is at least one of the steps of handling the response from the controlling appliance, once it was informed about the retrieved network access guidance from the cellular network. Preferably in parallel the network access manager unit, respectively the communication unit takes for the upcoming operation within the cellular network the retrieved response from the controlling appliance into account as well.

To send an indication to the cellular network is in particular advantageous as the cellular network thus has a confirmation that the network access guidance was received in the first place. Further the cellular network thus gets aware in case of a non-momentary adaptation of the behavior from the sending wireless communication device.

As an alternative to an enhanced interpretation task by the network access manager unit, the cellular network is preferably further foreseen to provide with the network access guidance first a context of what kind of network access behavior is expected from the cellular network. With another response from the cellular network upon said providing of the indication from the network access manager unit the active base station sends the exact parameters applied to the behavior pattern.

This is in particular advantageous for the case of a selection between at least two behavioral patterns as part of the network access guidance. Further the controlling appliance does not necessarily need all details about the network access configurations, and it saves operating resources in the communication unit.

According to another embodiment it is proposed that the step of providing information to the controlling appliance further comprises writing information relating to received network access guidance in a logfile accessible for the controlling appliance.

With that embodiment an asynchronous communication method between communication unit and controlling appliance is setup. As long as it is assured that the logfiles are maintained for an appropriate time, this embodiment additionally allows besides a direct instruction from the controlling appliance to the communication unit about how to cope with the network access guidance, that in a later phase a reconstruction is possible about unexpected behavior from the controlling appliance perspective.

This in particular means, that the communication appliance receives the network access guidance and immediately carries out the instructions being part of the network access guidance, but with an information to the controlling appliance, in particular by means of the logfiles.

When the controlling appliances then figures out a change of behavior from the communication unit, in particular that a network access is not carried out in an expected time, then the controlling appliance is in the position to read out logfiles and find the indication relating to the respective network access guidance.

If possible the controlling appliance is in this case in the position to launch as a response to the information received via the logfile an instruction to the communication unit, which complements to said response from the controlling appliance, and thus to instruct the network access manager unit how to handle the network access guidance, hence how to operate with the received network access guidance in future. Hence a decision of the communication unit resp. the network access manager unit to accept operating following the network access guidance would then asynchronously overruled by the controlling appliance.

Further this embodiment is advantageous for diagnosis purposes, when with the logfiles a reason for a change of behavior from the perspective of the controlling appliance is retrievable later on, or in conjunction with test cases.

According to the second aspect of the invention it is proposed a wireless communication device operating in a cellular network, the wireless communication device comprising a communication unit and a controlling appliance, interconnected by a control interface, the communication unit comprising a network access manager unit and a network access unit, the communication unit being configured to:

receive from the cellular network a network access guidance handle the network access guidance at the network access manager unit, as part of handling the network access guidance, interpret the received network access guidance and provide information relating to the network access guidance resulting from said interpretation to the controlling appliance, ascertain by means of the control interface from the controlling appliance response relating to the network access guidance, handle in the network access manager unit the response relating to said network access guidance.

The second aspect shares the advantages of the first aspect of the invention. Preferably the communication unit being part of the wireless communication device further comprises a network access unit. This network access unit is the one which actually carries out the signaling with the active base station, hence a transceiver with the respective components. It is preferred that network access unit and network access manager unit have a direct interface, wherein both units are able to submit instructions and receive responses from and to each other. Further optional components of the wireless communication devices are advantageous.

According to a third aspect of the invention it is proposed a remote server configured to receive a message from a first wireless communication device, said message indicating a network access guidance received at the first wireless communication device, and to send in response to said reception at least one message to at least one second wireless communication device different from the first wireless communication device.

This remote server is the counterpart of said embodiment of the first aspect of the invention, where the method involved sending an indication to the remote server. As set out before, the remote server needs to be configured to receive from one wireless communication device, hereinafter the first communication device, an indication about a retrieved network access guidance. The remote server is then configured to send a message to at least a different wireless communication device—hereinafter the second wireless communication device—indicating the retrieved message from the first wireless communication device.

Preferably the remote server comprises a multitude of single server hardware components, which are connected by redundancy and/or load balancing mechanisms. Further an interface server connected to an internet and back-end servers, including database servers, behind a firewall are part of mentioned concept of the remote server.

The remote server further provides a repository of wireless communication devices, which are known to the remote server. Hence it is in the position to send to a plurality of second wireless communication devices referenced in the repository an indication, when it retrieves an indication from the first wireless communication device.

It is further foreseen that the remote server contacts the cellular network through a back end connection and informs the network about issues with the received network access guidance. Depending on a service level between the remote server operator and the network operator this might lead to a modification of the network access guidances sent to at least one wireless communication device belonging to the fleet of devices handled by the remote server.

As it is shown this invention advantageously solves the depicted problem and suggests a convenient and appropriate work flow and message flow between the involved components.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a wireless communication device 1.1 of the type to which the present invention is applied as an embodiment. As part of the wireless communication device 1.1 those components are shown that are useful as part of present invention. Further components may also be preferable.

Figure 1:
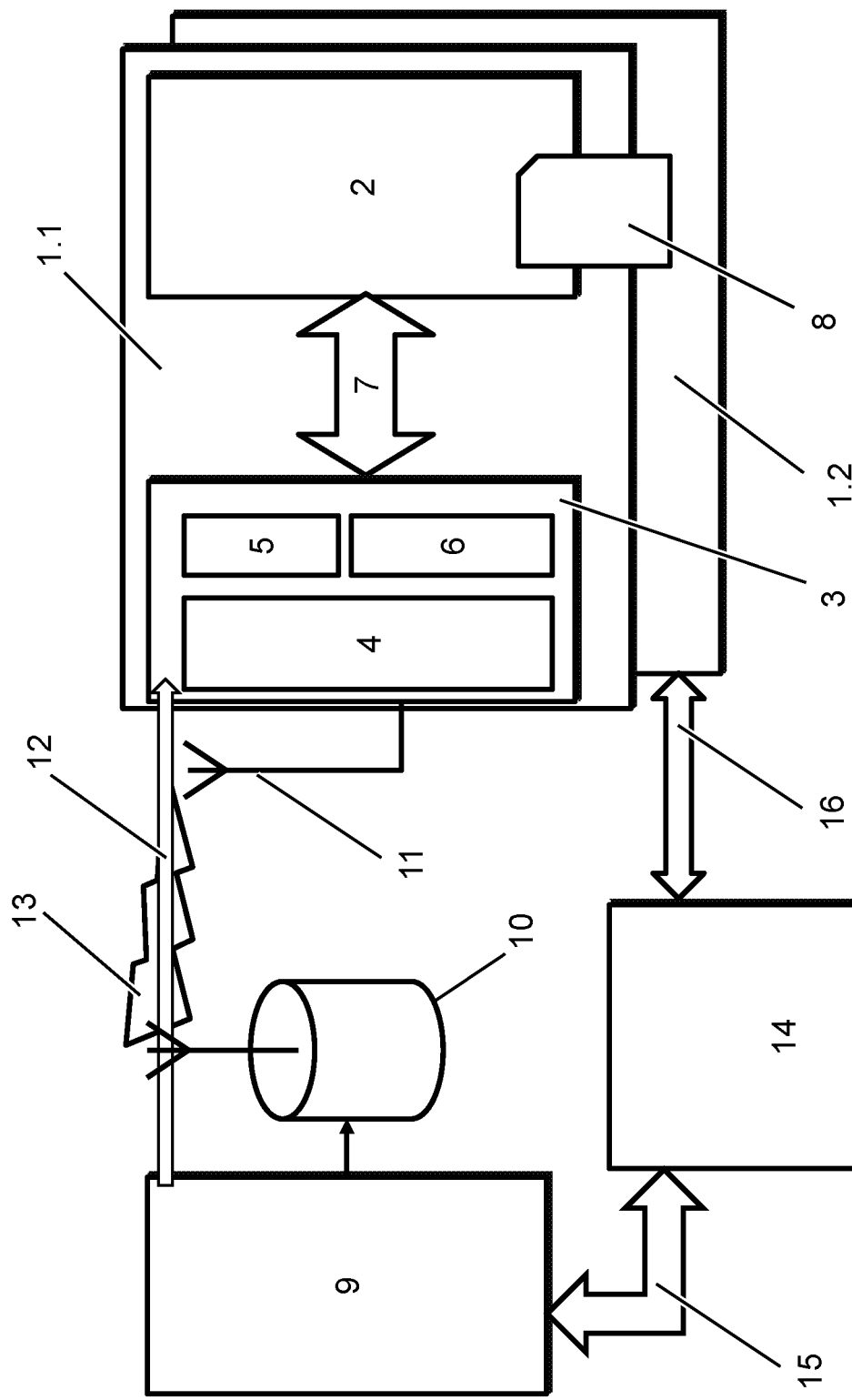
FIG. 1 represents a device of the type to which the present invention is applied as an embodiment.

The main control unit of the wireless communication device 1.1 is the controlling appliance 2, which typically comprises a central processing unit, memory and firmware software stored in the memory and able to be executed on the central process unit. Typically at least a minimal user interface, e.g. a power on/power off button is available.

Additionally a subscriber identity module (SIM) card 8 is typically removable attached to the controlling unit.

Further the wireless communication device 1.1 comprises a communication unit 3. This is typically an integrated component, known as modem or machine-to-machine (M2M) module, which comprises all necessary building elements needed for registering in a cellular network 9 and sending and retrieving messages with it. The building elements comprise in particular the network access unit 4, the network access manager unit 5, and the communication unit firmware 6, whereby at least two of these components may be integrated, in particular within one executable and/or library.

The network access unit necessarily provides a transceiver, clock, protocol stack and baseband processor. It is directly connected to the antenna 11.

The controlling appliance 2, respective said firmware software is configured to send instructions to the communication unit 3 by means of the control interface 7. This control interface is in particular a call interface where the communication unit 3 sends a response at least for confirmation upon each or at least most of the received instructions.

In particular the control interface is the so-called AT-interface implementing the Hayes command set, plus optionally additional proprietary commands. The AT interface is a quasi-standard for control of modems.

Other interfaces like a functional call interface with a common high-level programming language like Java are further options for implementing the control interface 7.

As it is indicated with the double arrow, the control interface in particular needs the capability to provide asynchronously messages from the communication unit to the controlling appliances. This is for an AT-interface the unsolicited result command (URC), for a high-level programming language this is in particular an exception, for low-level programming languages an interrupt.

With that the communication unit 3 is put in the position to provide without remarkable delay information about an event, in particular a message from the cellular network 9 to the controlling appliance 2.

The connection to the cellular network 9 is carried out over the air interface 12 between the antenna 11 and the antenna of a base station 10. Each base station 10 covers a geographical area, a cell with connectivity to the cellular network 9, where it is an integral part of. Each cellular network 9 comprises a plurality of base stations 10. Depending upon the wireless cellular technology standard supported by the base stations resp. the cellular network, further components are typically available. Further one cellular network may support a multitude of wireless cellular technology standards which each need its individual base stations. All those details are omitted in this exemplary embodiment.

The exemplary embodiment of the invention is triggered by a network access guidance 13 provided from the cellular network via the base station 10 and the antenna 11 to the communication unit 3, and handled there in particular in the network access manager unit 5.

Part of the handling of the network access guidance 13 is in particular access to a remote server 14, which is in one preferred embodiment connected to the cellular network 9, hence the communication unit 3 may send a message via the cellular network to the remote server 14 via a backend connection 15, in particular an IP connection. The remote server is further configured to send via another connection 16 a message to a second wireless communication device (1.2).

Figure 2:
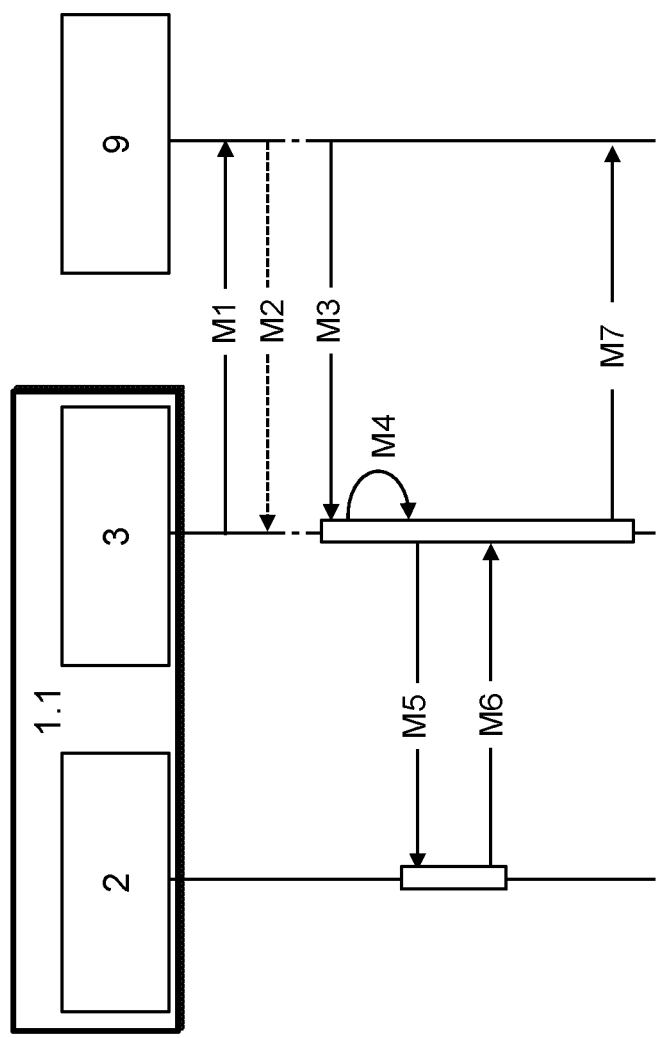
FIG. 2 shows a sequence diagram of an exemplary embodiment of the present inventive method.

FIG. 2 shows a basic method flow for an exemplary embodiment of the inventive method. Involved are the controlling appliance 2 and the communication unit 3 of the first wireless communication device 1.1. Further the cellular network 9 is involved.

The process according to the preferred embodiment of the invention starts with the registration request M1 from the communication unit 3 to the cellular network, in particular represented by a base station. With the registration request the communication unit provides authentication credentials stored in the SIM card 8 to the cellular network 9. The cellular network confirms with message M2 the registration of the wireless communication device 1.1 in the cellular network.

Following the registration, the wireless communication device 1.1 is operating within the cellular network 9, preferably for a certain period of time, which may involve data transmissions and/or receptions, cell changes etc.

Through a trigger typically originated at the cellular network side the cellular network 9 then launches a message M13 comprising a network access guidance 13. Such a network access guidance 13 may consists of one instruction transferred with one message, or of a couple of instructions which are transmitted as part of one or more transmissions. For simplicity reasons in the following it is assumed that the network access guidance 13 comprises one instruction, in particular a network friendly mode instruction, transmit within one message.

The network access guidance 13 is preferably handled within the network access manager unit 5 of the communication unit 3. In the case of a network friendly mode instruction the network access manager unit 5 has the task to interpret the network access guidance 13 with step M4.

In particular this comprises in the example for a network friendly mode instruction, what kind of limitations this means for the controlling appliance, and potentially what kind of options are available. One option is in particular when to adapt the network behaviour of the communication unit according to the network friendly behaviour.

The result of this interpretation step M4 is transmitted with message M5 to the controlling appliance 2. Preferably this message M5 is provided as a URC to the controlling appliance.

The controlling appliance 2 consequently accepts this message and potentially elaborates if further pending data transmission or reception sessions are scheduled, in which context the wireless communication device currently is active, and potentially far more. This means, the majority of information needed for deciding about the network access guidance 13 is available in the controlling appliance 2.

Hence a well-based decision is provided as a response with message M6, preferably by means of an AT command to the communication unit 3.

Typically the communication unit confirms reception of the AT command, which is not shown here.

Further it is foreseen to carry out an evaluation step on the side of the communication unit 3, resp. the network access manager unit, with respect to the response M6 from the controlling appliance 2. This evaluation step preferably involves more messaging between controlling appliance and network access manager unit, in order to come by way of a negotiation to a decision how to cope with the network access guidance. This is advantageous as with this evaluation step the knowledge e.g. about the context, of both components—the controlling appliance 2 and the communication unit 3—is taken into account for the decision on the received network access guidance.

With the decision the communication unit, in particular the network access management unit has two tasks within this exemplary embodiment: first to apply the instruction received from the controlling appliance, second to inform the cellular network about the decision of the controlling appliance. The latter happens with message M7.

As part of this message in particular a reason, preferably provided by the controlling appliance, is provided with the message M7. This is in particular of interest in the case of an inappropriate network access guidance, where the cellular network is informed by the wireless communication device that it will not follow the network access guidance.

Should the wireless communication device be stationary device and receive a network access guidance 13 concerning mobility behaviour, then the response in message M7 would comprise an information that the network access guidance is ignored, and why. That the wireless communication device is a stationary device is upfront however only known to the controlling appliance as part of the context. Hence this is the right place to take this decision and indicate the reason for it, which is then forwarded by the communication unit to the cellular network.

In response to message M7 the cellular network might indicate in another message a confirmation resp. a correction message, taking into account the received reason for ignoring the network access message.

Further message M7 to the cellular network is advantageous when the network access guidance only provides the context of the advised behaviour, or gives a choice between two behaviours, described by the context where the behaviour options are applicable. This provided context is typically already the result of the interpretation step which is usually carried out in the network access management unit, and hence provided to the controlling appliance for a comparison with the active context of the controlling appliance.

In this case with message M7 the communication unit requests for details of how the selected or depicted network access behaviour is to be carried out. The cellular network would then provide the communication unit with all details—which are of no interest to the controlling appliance—for how to behave in the cellular network.

Figure 3:
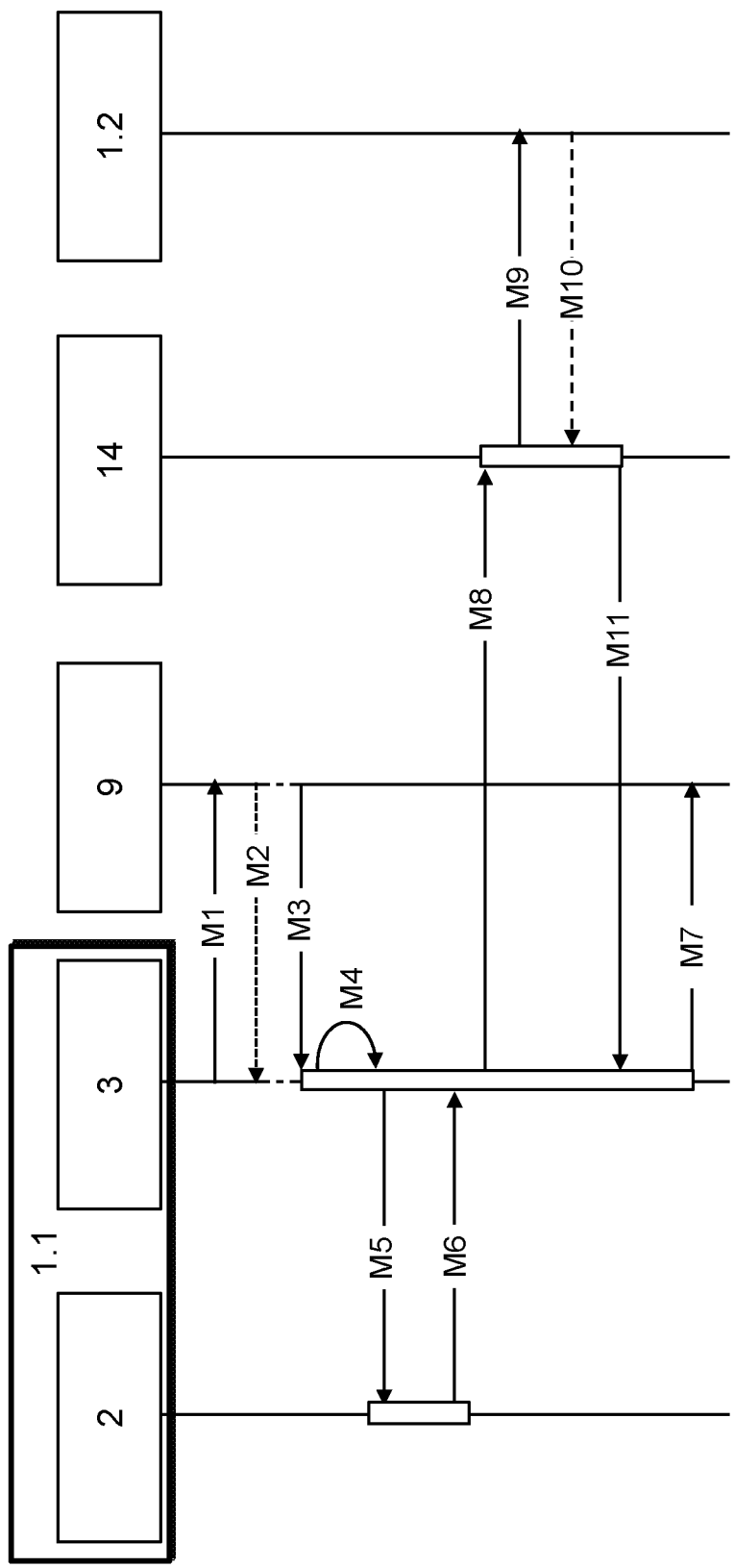
FIG. 3 shows another sequence diagram of another exemplary embodiment of the present inventive method.

FIG. 3 shows another sequence diagram of an enhanced embodiment of the inventive method, starting with exactly the same message flow as in FIG. 2. However the controlling appliance 2 further indicates with message M6 to the communication unit that remote server 14 needs to be informed about the incoming network access guidance. The remote server 14 is in particular a fleet server being the central contact point for a plurality of wireless communication devices 1.1, 1.2, . . . .

Consequently the communication unit 3 sends message M8 to the remote server 14. If this sending is done by means of the cellular network, or by other connectivity means are two possible options of this embodiment. In the latter case even a second communication unit could be involved, in particular triggered by the first communication unit.

The message M8 to the remote server in particular has one of two objectives. The first objective is to request the remote server for an indication how to cope with the network access guidance. This is in particular the case when the controlling appliance is not prepared to answer this question and hence asks for external help, which is provided to the communication unit with message M11.

Hence the communication unit applies this received information to its behaviour and consequently as in FIG. 2 informs the cellular network about the decision with message M7.

As an alternative or additional second option the remote server 14 is informed in order to be able to provide at least one other wireless communication device 1.2 known to the remote server with the information about the received network access guidance. This information provided with message M9 is in particular a proactive indication how to act within the cellular network according to the network access guidance—thus saving requests from the other wireless communication devices to the remote server.

The other wireless communication device 1.2 confirms with message M10, which is in particular a simple ACK. Again, the connection between the remote server 14 and the wireless communication device 1.2 does not necessarily need to be the cellular network 9, but of course can.

With involving the remote server 14, the handling of the network access guidance 13 is put onto wider base and allows more options that both allow better decisions how to cope with the network access guidance and reduce signalling for a fleet of wireless communication devices handled by the remote server 14, once one of the wireless communication devices belonging to the fleet receives the network access guidance message.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

REFERENCE SIGNS

1 Wireless communication device
2 Controlling appliance
3 Communication unit
4 Network access unit
5. Network access manager unit
6 Communication unit firmware
7 Control interface
8 SIM card
9 Cellular network
10 Base station
11 Antenna
12 Air interface
13 Network access guidance
14 Remote server
15 Backend connection
16 Second remote server connection

The invention claimed is:

1. Method for operating a wireless communication device in a cellular network, the wireless communication device comprising a communication unit and a controlling appliance, interconnected by a control interface, the communication unit comprising a network access manager unit, the method comprising for the communication unit the steps of:
receiving from the cellular network a network access guidance,
handling the received network access guidance at the network access manager unit,
as part of handling the network access guidance, interpreting the received network access guidance, wherein the interpreting includes converting the network access guidance from a network signaling context to a controlling appliance context, and providing such converted information relating to the network access guidance from the network access manager unit of the wireless communication device to the controlling appliance of the wireless communication device,
ascertaining by means of the control interface from the controlling appliance a response relating to said network access guidance, and
handling in the network access manager unit the response relating to said network access guidance.

2. Method according to claim 1, wherein said response from the controlling appliance comprises an instruction relating to time of execution of network access guidance, and the step of handling said response comprises executing the network access guidance complying with said time.

3. Method according to claim 1, wherein said response from controlling appliance comprises an instruction relating to a selection of a behavior pattern being part of said information relating to the network access guidance, and the step of handling said response comprises applying the selected behavior pattern on network access.

4. Method according to claim 1, wherein said response from the controlling appliance comprises an instruction relating to reject execution of the network access guidance, and the step of handling said response comprises ignoring the network access guidance.

5. Method according to claim 1, wherein said response from the controlling appliance comprises an instruction relating to contact a preconfigured remote server, and the step of handling said response comprises sending a message to the remote server indicating the network access guidance.

6. Method according to claim 5, wherein in response to said message the remote server sends at least one message to at least one wireless communication device different from the wireless communication device sending the message to the remote server.

7. Method according to claim 1, comprising for the network access manager unit as part of handling the response from the control appliance the step of providing the cellular network with an indication relating to the received response.

8. Method according to claim 1, wherein the network access guidance is at least one out of the group of:
a request for over the air software installation,
a configuration of a radio policy manager software running in the communication unit,
a presetting value of quality of service requirement of the communication unit,
a network access restriction,
a network friendly mode instruction, and/or
a combination of at least two of said group members.

9. Method according to claim 1, wherein the step of providing information to the controlling appliance comprises writing information relating to the received network access guidance in a logfile accessible for the controlling appliance.

10. Wireless communication device operating in a cellular network, the wireless communication device comprising a communication unit and a controlling appliance, interconnected by a control interface, the communication unit comprising a network access manager unit, the communication unit being configured to:
- receive from the cellular network a network access guidance,
- handle the network access guidance at the network access manager unit,
- as part of handling the network access guidance, interpret the received network access guidance, wherein the interpreting includes converting the network access guidance from a network signaling context to a controlling appliance context, and provide such converted information relating to the network access guidance from the network access manager unit of the wireless communication device to the controlling appliance of the wireless communication device,
- ascertain by means of the control interface from the controlling appliance a response relating to the network access guidance, and
- handle in the network access manager unit the response relating to said network access guidance.

11. Wireless communication device according to claim 10, wherein said response from the controlling appliance comprises at least one out of the group of:
- an instruction relating to time of execution of the network access guidance,
- an instruction relating to a selection of a behavior pattern being part of said information relating to the network access guidance,
- an instruction to reject execution of the network access guidance,
- an instruction relating to contact a preconfigured remote server.

12. Wireless communication device according to claim 10, wherein the network access manager unit is configured as part of handling the response from the control appliance to send to the cellular network an indication relating to the received response.

13. Wireless communication device according to claim 10, wherein the network access guidance is at least one out of the group of:
- a request for over the air firmware installation,
- a configuration of a radio policy manager software running in the communication unit,
- a presetting value of quality of service requirement of the communication unit,
- a network friendly mode instruction, and/or
- a combination of at least two of said group members.

14. A system comprising:
- a remote server configured to:
  - receive a message from a first wireless communication device, wherein the wireless communication device is a machine-type communication device, said message indicating a network access guidance received at the first wireless communication device, wherein the network access guidance comprises one or more instructions on how wireless devices are to behave when operating in a cellular network, and
  - send in response to said reception at least one message to at least one second wireless communication device different from the first wireless communication device, said message comprising a recommendation for behavior of said at least one second wireless communication device; and
- the first wireless communication device configured to:
  - receive from the cellular network the network access guidance,
  - handle the received network access guidance at a network access manager unit of the first wireless communication device,
  - as part of handling the network access guidance, interpret the received network access guidance, wherein the interpreting includes converting the network access guidance from a network signaling context to a controlling appliance context, and providing such converted information relating to the network access guidance from the network access manager unit of the first wireless communication device to a controlling appliance of the first wireless communication device,
  - ascertain by means of a control interface from the controlling appliance a response relating to said network access guidance, and
  - handle in the network access manager unit the response relating to said network access guidance.

\* \* \* \* \*